(12) United States Patent
Kawata

(10) Patent No.: US 9,219,838 B2
(45) Date of Patent: Dec. 22, 2015

(54) OVERHEAD IMAGE READING APPARATUS

(71) Applicant: PFU Limited, Kahoku-shi, Ishikawa (JP)

(72) Inventor: Kengo Kawata, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 7 days.

(21) Appl. No.: 13/864,117

(22) Filed: Apr. 16, 2013

(65) Prior Publication Data
US 2013/0335787 A1  Dec. 19, 2013

(30) Foreign Application Priority Data
Jun. 13, 2012 (JP) .................. 2012-134184

(51) Int. Cl.
H04N 1/04 (2006.01)
H04N 1/028 (2006.01)
H04N 1/00 (2006.01)
H04N 1/40 (2006.01)
H04N 1/10 (2006.01)

(52) U.S. Cl.
CPC ....... *H04N 1/02815* (2013.01); *H04N 1/00726* (2013.01); *H04N 1/00734* (2013.01); *H04N 1/00806* (2013.01); *H04N 1/40056* (2013.01); *H04N 1/10* (2013.01); *H04N 2201/02497* (2013.01); *H04N 2201/0436* (2013.01)

(58) Field of Classification Search
CPC .......... H04N 1/02815; H04N 1/00726; H04N 1/00734; H04N 1/00806; H04N 1/10; H04N 1/40056
USPC ........................ 358/474, 475, 488, 493, 464
See application file for complete search history.

(56) References Cited

U.S. PATENT DOCUMENTS

| 5,808,756 | A | * | 9/1998 | Matsuda ..................... 358/474 |
| 6,984,034 | B2 | | 1/2006 | Tsujimoto |
| 7,125,114 | B2 | | 10/2006 | Tsujimoto |
| D573,146 | S | * | 7/2008 | Sukenari et al. ............. D14/431 |
| 7,394,978 | B2 | * | 7/2008 | Sukenari et al. ............. 396/155 |
| 7,750,330 | B2 | | 7/2010 | Murata |
| D699,242 | S | * | 2/2014 | Hu ............................. D14/423 |
| 2006/0110151 | A1 | | 5/2006 | Sukenari et al. |
| 2009/0296168 | A1 | * | 12/2009 | Proudfoot et al. ............ 358/475 |

(Continued)

FOREIGN PATENT DOCUMENTS

| JP | 09-200440 A | 7/1997 |
| JP | 10-327301 A | 12/1998 |

(Continued)

OTHER PUBLICATIONS

Office Action Chinese Patent Application No. 201310223773.1 dated May 11, 2015.

(Continued)

*Primary Examiner* — Houshang Safaipour
(74) *Attorney, Agent, or Firm* — McDermott Will & Emery LLP

(57) ABSTRACT

An overhead scanner 1 includes an imaging unit 22 that images a medium S placed on a mount surface 2 to be read from above and a light source 21 that is arranged to be able to irradiate the medium S with light during imaging by the imaging unit 22. A control device 40 of the overhead scanner 1 performs anti-glare control when detecting that the medium S is glossy. This prevents glare from occurring to the user during operation of the overhead scanner 1.

4 Claims, 6 Drawing Sheets

(56) References Cited

U.S. PATENT DOCUMENTS

| | | |
|---|---|---|
| 2011/0299136 A1* | 12/2011 | Kubo et al. .................... 358/474 |
| 2011/0309568 A1 | 12/2011 | Okano et al. |
| 2012/0075432 A1* | 3/2012 | Bilbrey et al. ................... 348/48 |

FOREIGN PATENT DOCUMENTS

| | | |
|---|---|---|
| JP | 11-017873 A | 1/1999 |
| JP | 11-168600 A | 6/1999 |
| JP | 2000-078361 A | 3/2000 |
| JP | 2001-268323 A | 9/2001 |
| JP | 2002-116480 A | 4/2002 |
| JP | 2002-287270 A | 10/2002 |
| JP | 2003-157432 A | 5/2003 |
| JP | 2004-042371 A | 2/2004 |
| JP | 2006-166378 A | 6/2006 |
| JP | 2009-272805 A | 11/2009 |
| JP | 2012-006681 A | 1/2012 |

OTHER PUBLICATIONS

Office Action dated Aug. 18, 2015, which issued in related Japanese Patent Application No. 2012-134184.

* cited by examiner

OVERHEAD IMAGE READING APPARATUS

CROSS-REFERENCE TO RELATED APPLICATION(S)

This application is based on and claims the benefit of priority from Japanese Patent Application No. 2012-134184, filed on Jun. 13, 2012, the entire contents of which are incorporated herein by reference.

BACKGROUND OF THE INVENTION

1. Field of the Invention

The present invention relates to an overhead image reading apparatus.

2. Description of the Related Art

Overhead image reading apparatuses that can read an image on a medium to be read from above have been known in the past (Japanese Patent Application Laid-Open No. 10-327301, for example). With regard to such an overhead image reading apparatus, the medium is irradiated with light from a light source positioned above during operation for reading the medium.

When the overhead image reading apparatus reads a medium having a glossy surface to be read, light emitted from the light source is reflected by the medium toward the user in front of the apparatus. This may cause the user the so-called glare, that is, disgust, discomfort, and dazzle that makes an object difficult to see.

SUMMARY OF THE INVENTION

The present invention is directed to an overhead image reading apparatus. The overhead image reading apparatus includes an imaging unit that images from above a medium to be read placed on a placing surface, and a light source arranged in order to irradiate the medium with light during imaging by the imaging unit. Anti-glare control is performed when the medium is detected to be glossy.

DETAILED DESCRIPTION OF THE INVENTION

Figure 1:
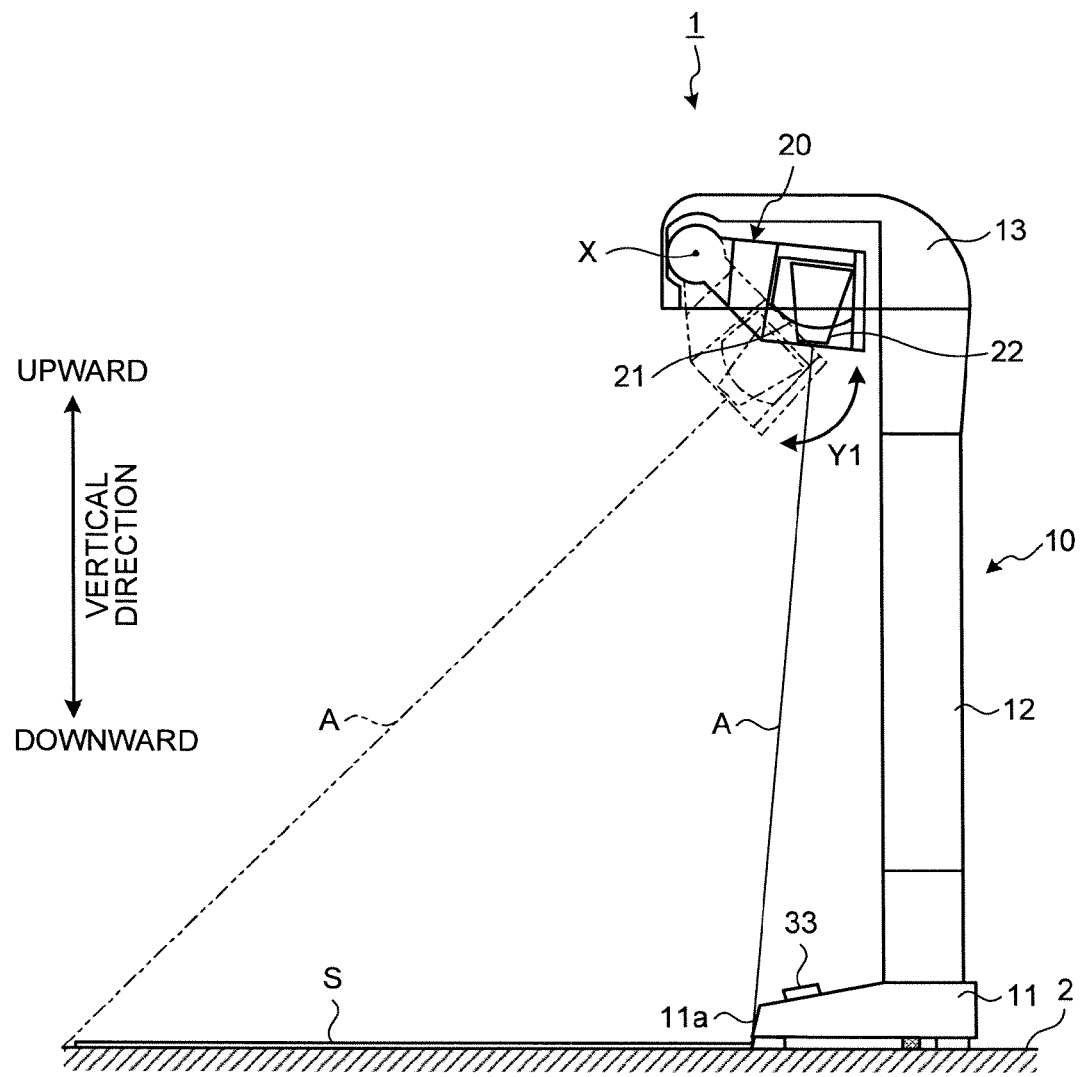
FIG. 1 is a side view illustrating a schematic configuration of an overhead scanner as an example of an overhead image reading apparatus according to an embodiment of the present invention.

An embodiment of an overhead image reading apparatus according to the present invention will be described below with reference to the drawings. Identical or corresponding parts in the drawings will be designated by the same reference numerals, and description thereof will not be repeated.

Figure 2:
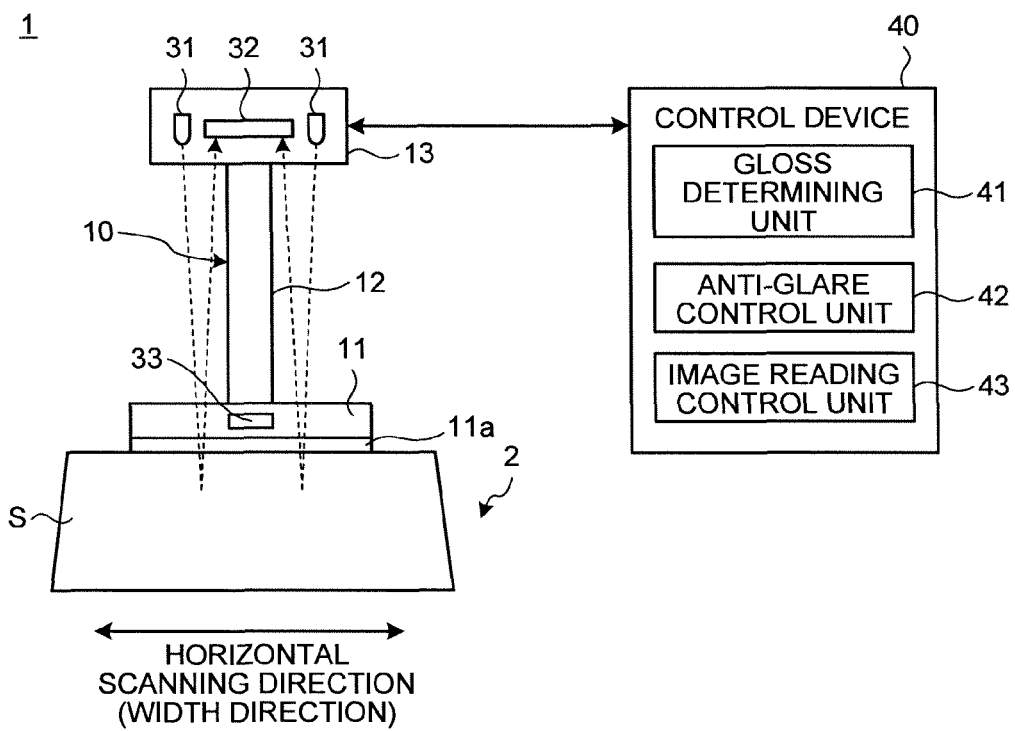
FIG. 2 is a diagram illustrating a main configuration relating to gloss determination and anti-glare control in a front view of the overhead scanner illustrated in FIG. 1.

In the following embodiment, an overhead scanner as an example of an overhead image reading apparatus capable of reading an image on a medium to be read from above will be described. First, the configuration of the overhead scanner according to the embodiment will be described with reference to FIGS. 1 and 2. FIG. 1 is a side view illustrating a schematic configuration of the overhead scanner as an example of the overhead image reading apparatus according to the embodiment of the present invention. FIG. 2 is a diagram illustrating a main configuration relating to gloss determination and anti-glare control in a front view of the overhead scanner illustrated in FIG. 1.

As illustrated in FIGS. 1 and 2, a overhead scanner 1 includes a body 10 and an optical unit 20. The overhead scanner 1 can read an image on a medium S to be read (as a reading target) placed on a placing surface 2, below in the vertical direction of the optical unit 20. The placing surface 2 is a flat surface such as an upper surface of a table on which the overhead scanner 1 is installed.

The body 10 includes a stand 11, an arm 12 and a support 13. The stand 11 is placed on the placing surface 2 and supports the entire body 10, serving as a base of the body 10. Operating members of the overhead scanner 1 such as a power switch and a switch for starting image reading are provided on the stand 11, for example.

The medium S (also referred to as an original S) is placed in a manner that one side of the medium S is butted against a front surface 11a that is one of four side surfaces of the stand 11. That is, the medium S is placed on the mount surface 2 so that one side of the rectangular shape thereof is parallel to the front surface 11a of the stand 11. In the embodiment, the direction of the medium S placed in this manner that is parallel to the front surface 11a of the stand 11 will be referred to as the "width direction" or the "horizontal scanning direction". On the other hand, the direction parallel to a side of the medium S perpendicular to the side thereof parallel to the front surface 11a will be referred to as the "depth direction" or the "vertical scanning direction". In other words, the depth direction is a direction in which the user and the overhead scanner 1 face each other when the user is opposed to the overhead scanner 1 with the medium S therebetween. In the depth direction, the direction from the stand 11 toward the medium S will be referred to as a forward direction and the direction from the medium S toward the stand 11 will be referred to as a backward direction.

The arm 12 is connected with the stand 11 and extends upward in the vertical direction from the stand 11. The arm 12 is formed into a columnar shape having a rectangular cross-section or a chimney-like shape, for example. The arm 12 is connected at the center in the width direction of the stand 11.

The support 13 is connected to an upper end portion of the arm 12 in the vertical direction. The support 13 protrudes forward in the vertical scanning direction from the upper end of the arm 12. Furthermore, the support 13 protrudes toward both sides in the width direction from the upper end of the arm 12. In other words, the support 13 sticks out from the arm 12 over the side on which the medium S is placed and from the arm 12 over both sides in the width direction.

The optical unit 20 is supported by the support 13 rotatably about a rotation axis X. The rotation axis X extends in the width direction at a position in the support 13, that is, at a position protruding from the upper end portion of the arm 12 in the vertical direction to the placing side. The optical unit 20 can swing about the rotation axis X by a drive force about the rotation axis X output from a drive unit (not illustrated) arranged in the support 13.

The optical unit 20 includes a light source 21 and an imaging unit 22 (imaging unit). The light source 21 includes a light emitting portion such as an LED, and can emit light toward the medium S from above in the vertical direction. The light source 21 irradiates an image on a line L to be read on the medium S, that is, the image to be read with light.

The imaging unit 22 is an image sensor having a charge coupled device (CCD), for example, and can image the medium S to be read placed on the mount surface 2 below the optical unit 20 in the vertical direction. The imaging unit 22 is a line sensor in which a plurality of pixels for reading images is arrayed in the horizontal scanning direction, and converts light reflected by an image to be read on a line to be read into electronic data, by photoelectric conversion, to generate image data of the image on the read line. The imaging unit 22 can image the entire medium S by swinging about the rotation axis X of the optical unit 20.

FIG. 1 illustrates in a solid line a state in which the optical unit 20 of the overhead scanner 1 is at a rotational position (backmost reading position) when an image on the backmost line in a readable range is read. FIG. 1 also illustrates in an alternate long and two short dashes line a state in which the optical unit 20 is at a rotational position (frontmost reading position) when an image on the frontmost line in the readable range is read. The backmost reading position is an initial position for the overhead scanner 1 to start reading an image. Then, the optical unit 20 is rotated in a feeding direction Y1 so that the light source 21 and the imaging unit 22 of the optical unit 20 move forward. With this operation, the overhead scanner 1 can sequentially read the medium S from the back to the front, by moving the line to be read by the imaging unit 22 forward.

In this manner, the overhead scanner 1 moves the line to be read by the imaging unit 22 from the back to the front, in the operation of reading the medium S. In this process, an optical axis A of the light source 21 is always tilted forward as it goes downward in the vertical direction, as illustrated in FIG. 1. As the line to be read moves forward, the tilt angle of the optical axis A changes continuously. Because of this, when the medium S is glossy, light from the light source 21 is reflected by the medium S and the reflected light may travel toward the user in front of the apparatus, depending on the position of the user relative to the overhead scanner 1. This may cause the user the so-called glare, that is, disgust, discomfort, and dazzle that makes an object difficult to see.

The overhead scanner 1 according to the embodiment is therefore configured to be capable of performing a gloss determination function for determining whether or not a medium S placed on the placing surface 2 is glossy and an anti-glare control function for controlling dazzle (glare) perceived by the user during scanning operation when the medium S is glossy. The overhead scanner 1 includes infrared LEDs 31 (light emitting unit), a USB camera 32 (light receiving unit), a white reference 33 and a control device 40.

The infrared LEDs 31 irradiate a medium S with infrared light for gloss detection. The infrared LEDs 31 are arranged inside the support 13 of the body 10 in a manner capable of emitting infrared light toward the placing surface 2 below. The infrared LEDs 31 emit infrared light for gloss detection of the medium S that is not visible. Therefore, the infrared LEDs 31, which is another light source different from the light source 21 for reading images, does not give uncomfortableness to the user.

The USB camera 32 detects light reflected by the medium S that is emitted from the infrared LEDs 31. The USB camera 32 is an image sensor that images from above a medium S placed on the placing surface 2. The USB camera 32, like the infrared LEDs 31, is also provided inside the support 13 of the body 10, facing the placing surface 2. The USB camera 32 is disposed so that the USB camera 32 is able to image at least an area including a position on the placing surface 2 irradiated by the infrared LEDs 31.

Furthermore, the USB camera 32 includes a wavelength cutoff filter (not illustrated), and is configured to be capable of blocking part or all of light in the visible wavelength range when receiving light and accurately detecting reflected infrared light of light emitted from the infrared LEDs 31. Note that the wavelength cutoff filter may be provided at a position other than that of the USB camera 32 as long as the position is on a light path between the infrared LEDs 31 and the USB camera 32. In the embodiment, the infrared LEDs 31 and the USB camera 32 function as an information obtaining unit for obtaining information from the medium S.

The white reference 33 is a component that is provided in an imaging area of the USB camera 32 and has a white surface facing the USB camera 32. The white reference 33 is imaged together with the medium S on the placing surface 2 by the USB camera 32, and the color of the white reference 33 is used as a reference color for analyzing the image taken. In the embodiment, the white reference 33 is arranged on an upper surface of the stand 11 of the body 10.

As illustrated in FIG. 2, two infrared LEDs 31 are provided so as to improve reliability of detection of reflected light originated from the infrared LEDs 31 by the USB camera 32. However, the number of infrared LEDs 31 may be one or more than two.

The relative positions of the infrared LEDs 31 and the USB camera 32 are adjusted so that the USB camera 32 can receive light emitted from the infrared LEDs 31 and reflected by glossy paper, when the medium S is glossy paper. As illustrated in FIG. 2, for example, inside the support 13, the USB camera 32 may be arranged at the center in the width direction and one infrared LED 31 may be arranged on each of the left side and the right side of the USB camera 32 in the width direction. The arrangement of the infrared LEDs 31 and the USB camera 32 may be any arrangement as long as the USB camera 32 is at a position capable of receiving reflected light originated from the infrared LEDs 31. For example, the infrared LEDs 31 and the USB camera 32 may be provided inside the support 13 in an arrangement other than the arrangement of the example of FIG. 2, or may be provided in another part such as the arm 12.

The control device 40 controls the operation of the respective components of the overhead scanner 1. In the embodiment, the control device 40 controls the infrared LEDs 31 and the USB camera 32 to determine whether or not a medium S on the placing surface 2 is glossy paper, on the basis of an image taken by the USB camera 32. If the medium placed on the placing surface 2 is glossy paper, the control device 40 also controls the optical unit 20, the light source 21, and the imaging unit 22 to perform anti-glare control.

Specifically, as illustrated in FIG. 2, the control device 40 is configured to realize functions of a gloss determining unit 41, an anti-glare control unit 42, and an image reading control unit 43, which will be described below.

The gloss determining unit 41 controls the operation of the infrared LEDs 31 and the USB camera 32 to determine whether or not a medium S on the placing surface 2 is glossy paper, on the basis of an image take by the USB camera 32. It should be noted that "glossy paper" in the embodiment includes media having smooth surfaces with high glossiness such as art paper, coated paper, glossy film laminated paper, glass and resin. Details of gloss determination processing performed by the gloss determining unit 41 will be described later with reference to FIG. 4.

If it is determined by the gloss determining unit 41 that the medium S placed on the placing surface 2 is glossy paper, the anti-glare control unit 42 controls the operation of the optical unit 20, the light source 21, and the imaging unit 22 to perform anti-glare control. The anti-glare control is control on the operation of various components of the overhead scanner 1 for suppressing dazzle (glare) perceived by the user during scanning operation, details of which will be described later with reference to FIGS. 5 to 10.

The image reading control unit 43 controls the operation of the optical unit 20, the light source 21, and the imaging unit 22 to control operation for reading an image on a medium S on the placing surface 2.

The control device 40 is a computer system physically including a central processing unit (CPU), a random access memory (RAM), a read only memory (ROM) and other components. All or some of the functions of the control device 40 described above are realized by performing reading and writing of data from and into the RAM and the ROM, by loading application programs held in the ROM into the RAM and executing the programs by the CPU. The control device 40 also includes an input device such as a keyboard and a mouse, a display device (see a reference numeral 44 in FIG. 6) such as a display, and a communication device such as an input/output port. All or some of the functions of the control device 40 described above are realized by input of instructions and operation by the user, display of messages to the user and gloss determination results, and communication with the body 10 and the optical unit 20 of the overhead scanner 1, with the application programs executed by the CPU using these devices.

Furthermore, the application programs may be stored in a computer readable recording medium or may be provided as a program product. It should be noted that the "recording medium" includes any "portable physical media" such as a memory card, a USB memory, an SD card, a flexible disk, a magneto-optical disk, a ROM, an EPROM, an EEPROM, a CD-ROM, an MO, a DVD, and a Blu-ray disc. Moreover, the application programs may be stored in an application program server connected to the control device 40 via a certain network, and all or some of the programs may be downloaded as need arises.

The control device 40 may be connected to the overhead scanner 1 as an external device thereof (see FIG. 6) or may be provided inside the overhead scanner 1.

Figure 3:
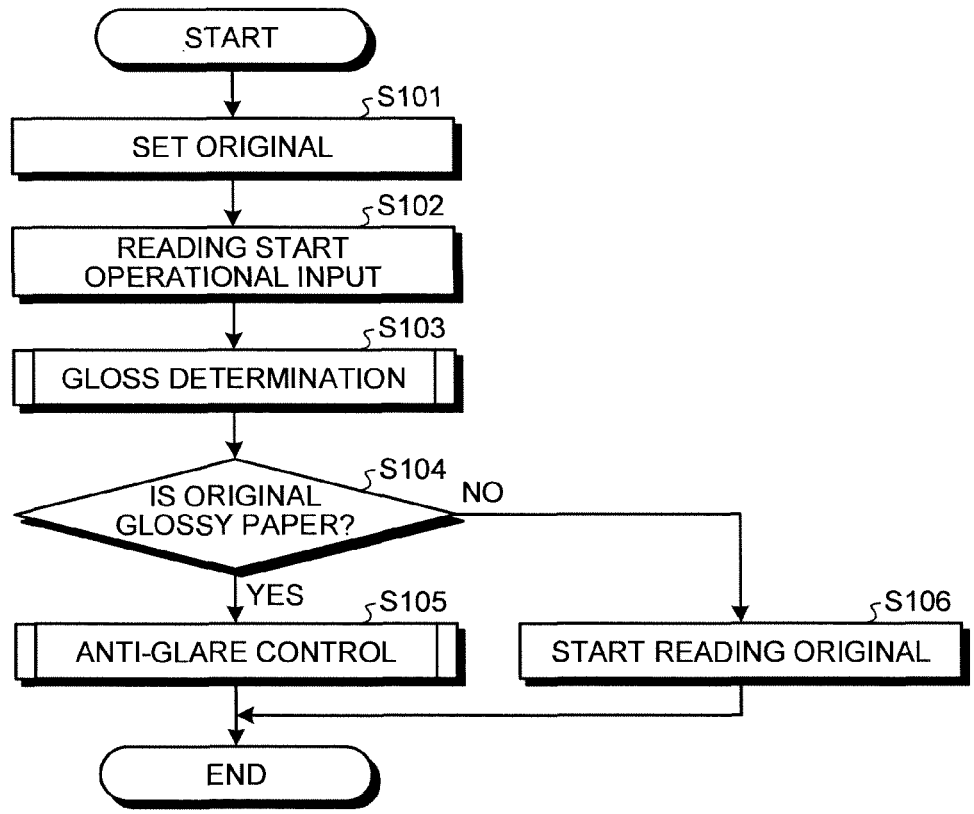
FIG. 3 is a flowchart illustrating a main flow of original reading processing performed by the overhead scanner according to the embodiment.
Figure 4:
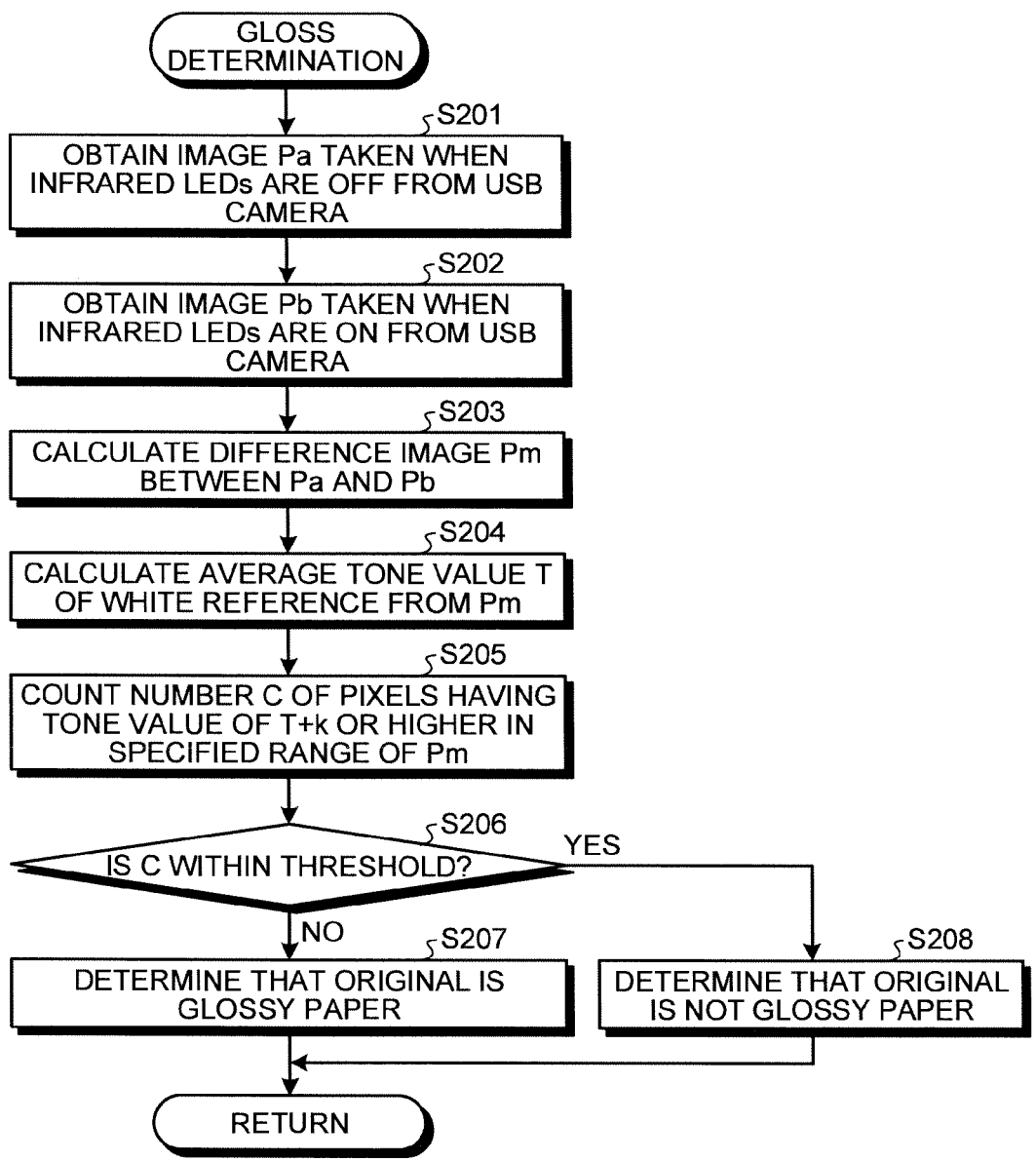
FIG. 4 is a flowchart illustrating a subroutine of gloss determination processing in the flowchart of FIG. 3.
Figure 5:
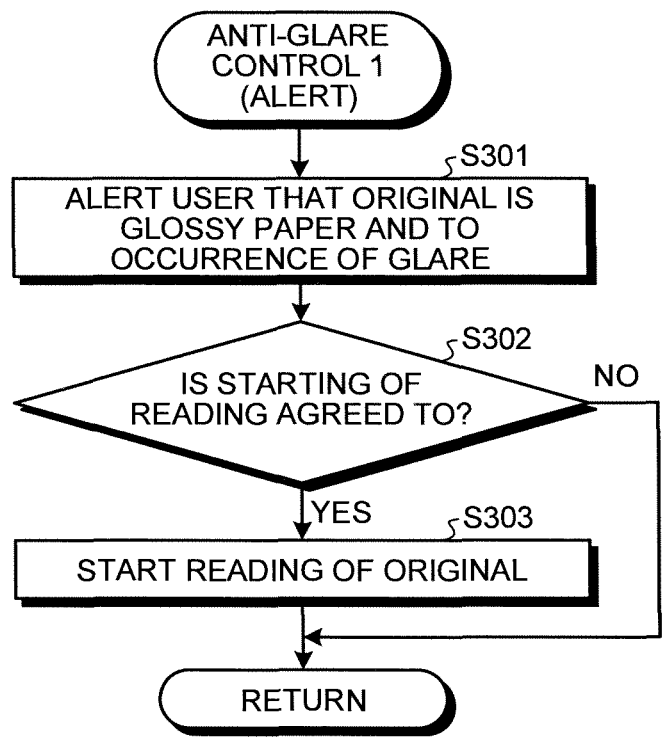
FIG. 5 is a flowchart illustrating a first subroutine (alert) of the anti-glare control processing in the flowchart of FIG. 3.
Figure 6:
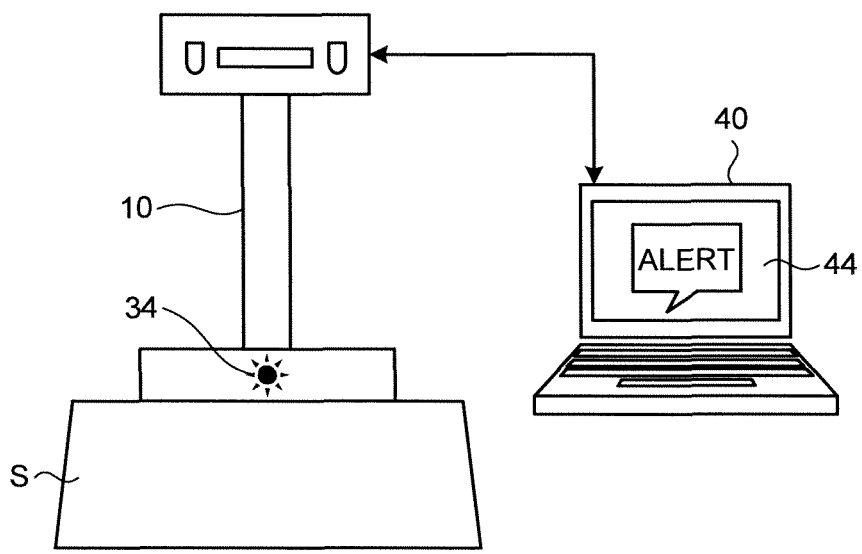
FIG. 6 is a schematic diagram for explaining alert in the first subroutine of the anti-glare control processing in FIG. 5.
Figure 7:
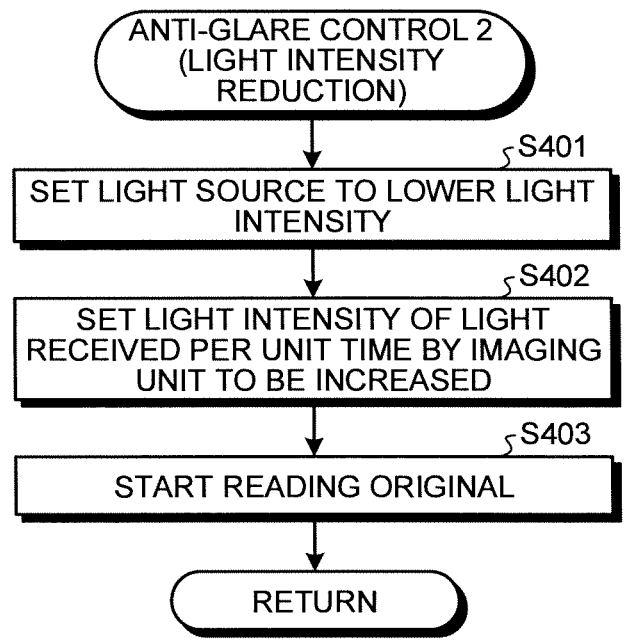
FIG. 7 is a flowchart illustrating a second subroutine (light intensity reduction) of the anti-glare control processing in the flowchart of FIG. 3.
Figure 8:
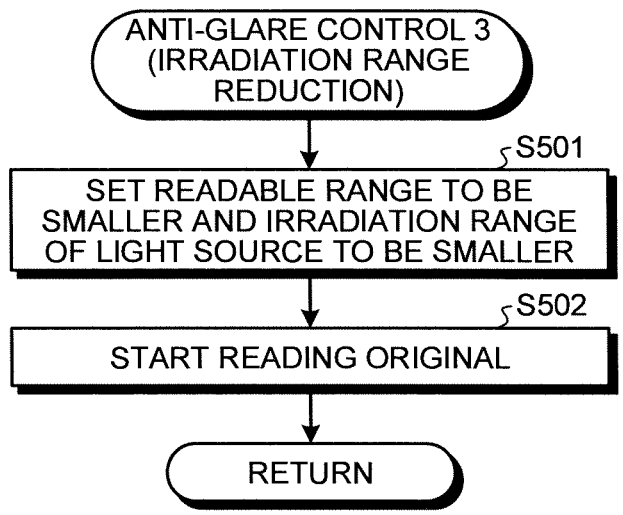
FIG. 8 is a flowchart illustrating a third subroutine (irradiation range reduction) of the anti-glare control processing in the flowchart of FIG. 3.
Figure 9:
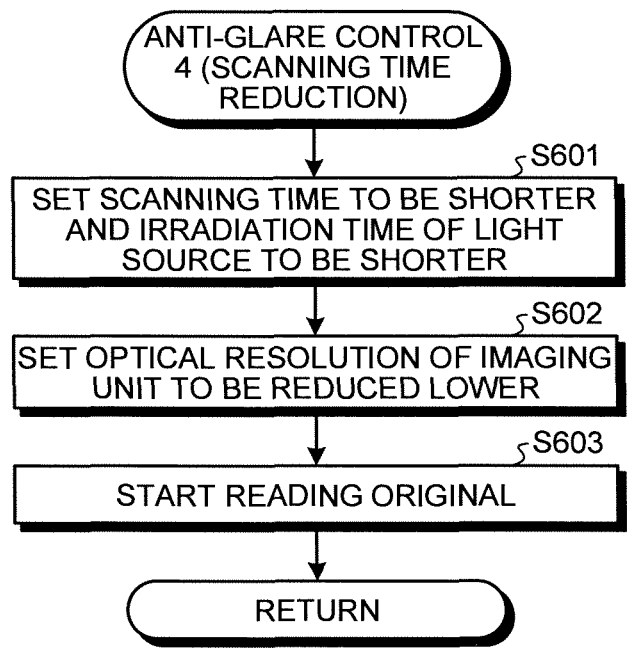
FIG. 9 is a flowchart illustrating a fourth subroutine (scanning time reduction) of the anti-glare control processing in the flowchart of FIG. 3.
Figure 10:
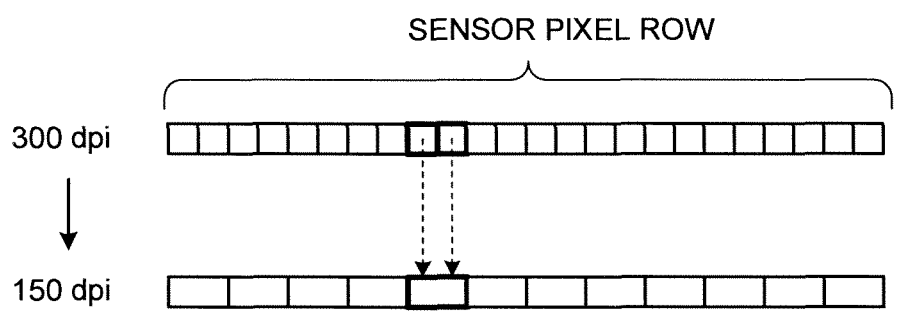
FIG. 10 is a schematic diagram for explaining processing for decreasing optical resolution in the fourth subroutine of the anti-glare control processing in FIG. 9.

Next, operation of the overhead scanner according to the embodiment will be described with reference to FIGS. 3 to 10. FIG. 3 is a flowchart illustrating a main flow of original reading processing performed by the overhead scanner according to the embodiment. FIG. 4 is a flowchart illustrating a subroutine of gloss determination processing in the flowchart of FIG. 3. FIG. 5 is a flowchart illustrating a first subroutine (alert) of anti-glare control processing in the flowchart of FIG. 3. FIG. 6 is a schematic diagram for explaining alert in the first subroutine of the anti-glare control processing in FIG. 5. FIG. 7 is a flowchart illustrating a second subroutine (light intensity reduction) of the anti-glare control processing in the flowchart of FIG. 3. FIG. 8 is a flowchart illustrating a third subroutine (irradiation range reduction) of the anti-glare control processing in the flowchart of FIG. 3. FIG. 9 is a flowchart illustrating a fourth subroutine (scanning time reduction) of the anti-glare control processing in the flowchart of FIG. 3. FIG. 10 is a schematic diagram for explaining processing for decreasing optical resolution in the fourth subroutine of the anti-glare control processing in FIG. 9.

As illustrated in the main flow of FIG. 3, when an original S is first set on the placing surface 2 by the user (S101) and operation for starting operation for reading the original S is input (S102), the gloss determination processing for determining whether or not the original S is glossy paper is performed by the gloss determining unit 41 (S103).

In the gloss determination processing in step S103, processing of the subroutine illustrated in FIG. 4 is performed.

First, turning on/off of the infrared LEDs 31 is controlled, so that an image Pa of the original S taken when the infrared LEDs 31 are off is obtained from the USB camera 32 (S201). Subsequently, an image Pb of the original S taken when the infrared LEDs 31 are on is obtained from the USB camera 32 (S202). Note that the images Pa and Pb obtained from the USB camera 32 are information containing tone values of pixels of the USB camera 32.

A difference image Pm between the taken image Pa of the original S obtained in step S201 and the taken image Pb of the original S obtained in step S202 is calculated by using Pa and Pb (S203). The difference image Pm is information containing differences in the tone values of the pixels of Pa and Pb.

Tone values of pixels in an area corresponding to the position where the white reference 33 is provided are extracted from the difference image Pm calculated in step S203. The extracted tone values are averaged to calculate an average tone value T of the white reference 33 (S204).

In a specified range of the difference image Pm, the number C of pixels having a tone value of T+k or higher is counted (S205). Note that the "specified range" is a range containing positions of bright spots produced on the medium S by the reflected light when the infrared LEDs 31 are turned on. k is an arbitrary constant, representing the degree of difference from the average tone value of the white reference 33. As the value of k is larger, the corresponding pixel is brighter.

Then, it is checked whether or not the number C of pixels calculated in step S205 is within a predetermined threshold (100 pixels, for example) (S206).

If, in the specified range of the difference image Pm, the number C of pixels having a tone value of T+k or higher is larger than the threshold (No in S206), it is assumed that the number of pixels having a light tone is large in the specified range of the difference image Pm, and that reflected light is produced in the specified range. Thus, it is determined that the original S is glossy paper (S207), and the processing returns to the main flow.

If, on the other hand, the number C of pixels having a tone value of T+k or higher is equal to or smaller than the threshold (Yes in S206), it is assumed that the number of pixels having a light tone is small in the specified range of the difference image Pm, and that reflected light is not produced in the specified range. Thus, it is determined that the original S is not glossy paper (S208), and the processing returns to the main flow.

That is, in the gloss determination processing illustrated in FIG. 4, it is determined whether or not the medium S is glossy on the basis of the tone of the white reference 33 in the images taken by the USB camera 32. Furthermore, it is determined whether or not the medium S is glossy on the basis of the difference image Pm between the images Pa and Pb taken by the USB camera 32 when the infrared LEDs 31 are off and on, respectively. In other words, first, the difference image Pm between the images Pa and Pb taken by the USB camera 32 when the infrared LEDs 31 are off and on, respectively, is first calculated. Then, differences between the tone values of the pixels of the difference image Pm and the average tone value T of the white reference 33 are calculated. And it is determined whether or not bright spots are present in the specified range of the taken images on the basis of the difference values. The difference values thus calculated are obtained by normalizing the information of the image Pb taken by the USB camera 32 when the infrared LEDs 31 are on, with the image Pa taken when the infrared LEDs 31 are off and the white reference 33. By using the information thus normalized, it is possible to reduce the influence of external environment such as room lighting and light from outside and to accurately perform gloss determination of the medium S.

Note that the calculation of the difference image Pm in step S203 may be skipped in the gloss determination processing described above. In this case, in step S204, the average tone value T of the white reference 33 is calculated from the image Pb, obtained in step S202, taken when the infrared LEDs 31 are on. In step S205, and the number C of pixels having a tone value of T+k or higher is calculated in the specified range of the taken image Pb.

Furthermore, in the gloss determination processing described above, the calculation of the average tone value T of the white reference 33 in step S204 may be skipped. In this case, in step S205, the number C of pixels having a predetermined tone value K (an arbitrary constant corresponding to "T+k") or higher is counted in the specified range of the difference image Pm.

Furthermore, while, in the gloss determination processing described above, the difference image Pm is a difference between the image Pa taken when the infrared LEDs 31 are off and the image Pb taken when the infrared LEDs are on, the difference image Pm may be a difference between images read when the infrared LEDs 31 output lights having two different light intensities, instead of whether the infrared LEDs 31 are off or on. In this case, the infrared LEDs 31 are configured to be capable of adjusting the light intensity in addition to the off/on states.

The description refers back to the main flow of FIG. 3, where it is checked whether or not the original is glossy paper as a result of the gloss determination processing in step S103 (S104). If the original S is glossy paper (Yes in S104), the anti-glare control is performed by the anti-glare control unit 42 so as to avoid the influence of the reflected light on the user (S105). And then, the processing is terminated. If, on the other hand, the original S is not glossy paper (No in S104), assuming that reflected light is not produced and that reading operation does not have a harmful effect on the user, reading of the original S is subsequently started by the image reading control unit 43 (S106). And then, the processing is terminated.

Processing of subroutines of the anti-glare control performed in step S105 of the main flow of FIG. 3 will be described with reference to FIGS. 5 to 10. In the embodiment, at least one of the following four methods can be selected and performed in the anti-glare control processing in step S105. Alternatively, a plurality of methods may be performed in combination. Furthermore, the configuration may be such that the user can arbitrarily enable or disable each method.
(1) Alert the user and suspend reading operation until the user agrees (anti-glare control 1 in FIG. 5).

(2) Reduce light intensity of the light source 21 (anti-glare control 2 in FIG. 7).
(3) Decrease the irradiation range of the light source 21 (anti-glare control 3 in FIG. 8).
(4) Increase the scanning speed of the imaging unit 22 and shorten irradiation time of the light source 21 (anti-glare control 4 in FIG. 9).

The anti-glare control 1 (alert) will be described with reference to FIGS. 5 and 6.

First, the user is alerted that the original S is glossy paper and to the possibility that glare may occur (S301). Specifically, for example, as illustrated in FIG. 6, the anti-glare control unit 42 displays an information message alerting the user that the original S is glossy paper and to occurrence of glare, in a popup dialogue box or a balloon on the display device 44 of the control device 40. Furthermore, the user is alerted by blinking or changing the lighting state of an alarm lamp 34 provided with the body 10 of the overhead scanner 1, or by sounding an alarm that uses a speaker attached to the body 10 or the control device 40. The anti-glare control unit 42 also suspends the operation of reading the original S by the image reading control unit 43 with the alert to the user, and enters a standby state.

Subsequently, it is checked whether or not the user agrees to start reading (S302). The agreement of the user can be recognized, for example, by detecting certain operation made by the user such as deleting the information message in step S301 on the screen by the user or inputting an instruction to start reading operation again by the user. If the user agrees (Yes in S302), the suspended state of the operation of reading the original S is cancelled, reading of the original S is started by the image reading control unit 43 (S303), and the processing returns to the main flow. If, on the other hand, the user does not agree (No in S302), the processing returns to the main flow, with the operation of reading the original S suspended. That is, if the user does not agree, reading of the original S is not performed in this processing.

Next, the anti-glare control 2 (light intensity reduction) will be described with reference to FIG. 7.

First, the light source 21 is set to lower the light intensity thereof (S401). For example, the light intensity of the light source 21 can be lowered by setting the luminance or duty ratio of the light source 21 to be lower by the anti-glare control unit 42.

The light intensity of light received per unit time by the imaging unit 22 is set to be increased so as to avoid degradation in the image quality (an increase in graininess and a decrease in tone) resulting from lowering the light intensity of the light source 21 in step S401 (S402). Specifically, the anti-glare control unit 42 changes various settings of the imaging unit 22 so as to increase the F number or increasing the exposure time or the scanning time, for example.

Then, in a state in which the light intensity of the light source 21 is lowered and the settings of the imaging unit 22 are changed in this manner, reading of the original S is started by the image reading control unit 43 (S403). And then, the processing returns to the main flow.

Next, the anti-glare control 3 (irradiation range reduction) will be described with reference to FIG. 8.

Unified glare rating (UGR) that is an index for rating the glare of typical lighting includes the "area of a light emitting surface of lighting" as a parameter for calculating the UGR. As the area of the light emitting surface is larger, the UGR is larger and the user feels more uncomfortable. Therefore, the irradiation range of the light source 21 is set to be smaller by reducing the readable range of the imaging unit 22 by the anti-glare control unit 42, such as reducing the size of the readable range of the imaging unit 22 of the optical unit 20 from an A3 paper size to an A4 paper size, for example (S501).

Then, in a state in which the irradiation range of lighting is reduced in this manner, reading of the original S is started by the image reading control unit 43 (S502). And then, the processing returns to the main flow.

Next, anti-glare control 4 (scanning time reduction) will be described with reference to FIGS. 9 and 10.

It can be expected that by shortening the emission time of the light source 21, the total amount of optical energy will be reduced and the burden on human eyes will be reduced. The light source 21 is turned on during operation for imaging the medium S by the imaging unit 22. Thus, the irradiation time of the light source 21 is set to be shorter by changing settings, so that the scanning time of the imaging unit 22 and the optical unit 20 is shortened by the anti-glare control unit 42, that is, the reading speed of the imaging unit 22 is increased (step S601).

As a result of increasing the reading speed of the imaging unit 22 in step S601, the light intensity of light received by the pixels of the imaging unit 22 is decreased. In order to suppress such a decrease in light intensity, the optical resolution of the imaging unit 22 is set to be lower by the anti-glare control unit 42 (S602). Specifically, as illustrated in FIG. 10, settings are changed so that a plurality of pixels of the imaging unit 22 is regarded as one pixel. In the example of FIG. 10, the optical resolution of 300 dpi of a one-dimensional sensor is reduced by half to 150 dpi by regarding two pixels as one pixel. Since the light intensity per pixel is doubled as a result, an equivalent light intensity can be obtained with the irradiation time reduced by half. Note that any other method may be used as long as the light intensity per pixel can be maintained.

Then, in a state in which the scanning time of the imaging unit 22 and the irradiation time of the light source 21 are shortened and the optical resolution is lowered, reading of the original S is started by the image reading control unit 43 (S603). And then, the processing returns to the main flow.

The overhead scanner 1 according to the embodiment includes the imaging unit 22 that images a medium S to be read placed on the placing surface 2 from above and the light source 21 arranged in a manner capable of irradiating the medium S with light during imaging by the imaging unit 22. The control device 40 of the overhead scanner 1 performs anti-glare control when it is detected that the medium S is glossy.

With this configuration, since the anti-glare control is performed when it is detected that the medium S is glossy, it is possible to reduce the impact of reflected light from the medium S on the user even when light emitted from the light source 21 is reflected by the glossy medium S toward the user during imaging of the medium S. This can suppress occurrence of glare to the user during operation of the overhead scanner 1.

For example, in the embodiment described above, while the gloss determining unit 41 of the control device 40 determines whether or not a medium S placed on the placing surface 2 is glossy paper on the basis of images taken by the USB camera 32, the configuration may be such that a medium S is detected to be glossy on the basis of a selection instruction from the user. For example, whether or not a medium S is glossy can be determined by detecting the following conditions. It is detected whether the medium S is glossy paper or is non-glossy paper; which selection button is pressed by the user, when the selection buttons associated with the types of original are provided on the body 10; or which selection operation is input by the user, when GUIs corresponding to these selection buttons via the display device 44 of the control device 40 are presented to the user.

While the overhead scanner 1 has been described as an example of an overhead image reading apparatus capable of reading an image on a medium S to be read from above in the embodiment described above, the present invention can also be applied to other overhead image reading apparatuses such as a copying machine, a facsimile machine, and a character recognition apparatus.

Furthermore, in the embodiment described above, the infrared LEDs 31 can be replaced with other light emitting units capable of irradiating a medium S placed on the placing surface 2 with light. The USB camera 32 can be replaced with other light receiving units including other image sensors capable of detecting light emitted by the light emitting unit and reflected by the medium S.

According to the embodiments of the present invention, the following advantages are produced. When detecting that a medium is glossy, the overhead image reading apparatus of the present invention performs anti-glare control, even if light emitted from the light source is reflected by the medium toward the user during imaging operation of the medium. Therefore, the impact on the user by the reflected light from the medium can be reduced. As a result, the overhead image reading apparatus produces the advantage that occurrence of glare to the user can be prevented during operation of the scanner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead image reading apparatus comprising:
   an optical unit including:
      an imager configured to image from above a medium to be read placed on a placing surface, and
      a light source configured to irradiate the medium with light during imaging by the imager;
   a support configured to rotatably support the optical unit for rotating the imager and the light source together about a rotation axis to image the medium;
   a controller configured to control the optical unit to perform anti-glare control when the medium is detected to be glossy,
   an information obtaining unit that obtains information from the medium; and
   a gloss determining unit that determines whether or not the medium is glossy on a basis of the information on the medium obtained by the information obtaining unit, wherein
   the controller includes an anti-glare control unit configured to control the light source to perform anti glare control, the anti glare control being one of reducing light intensity of the light source, reducing an irradiation range of the light source, and reducing irradiation time of the light source,
   when the medium is determined to be glossy by the gloss determining unit, the medium is detected to be glossy and the anti-glare control is performed,
   the information obtaining unit includes:
      at least one light emitting unit that irradiates the medium placed on the placing surface with light; and
      a light receiving unit that detects the light reflected by the medium, the light being emitted by the light emitting unit, the gloss determining unit determines whether or not the medium is glossy on a basis of the information on the medium obtained by the light receiving unit, and the light receiving unit is an image sensor, the image sensor includes a white reference in an imaging area thereof, and whether or not the medium is glossy is determined on a basis of a tone of the white reference in an image taken by the image sensor.

2. An overhead image reading apparatus comprising:

an optical unit including
- an imager configured to image from above a medium to be read placed on a placing surface, and
- a light source configured to irradiate the medium with light during imaging by the imager;

a support configured to rotatably support the optical unit for rotating the imager and light source together about a rotation axis to image the medium;

a controller configured to control the optical unit to perform anti-glare control when the medium is detected to be glossy;

an information obtaining unit that obtains information from the medium; and a gloss determining unit that determines whether or not the medium is glossy on a basis of the information on the medium obtained by the information obtaining unit, wherein the controller includes an anti-glare control unit configured to control the light source to perform anti-glare control, the anti-glare control being one of reducing light intensity of the light source, reducing an irradiation range of the light source, and reducing irradiation time of the light source, when the medium is determined to be glossy by the gloss determining unit, the medium is detected to be glossy and the anti-glare control is performed, the information obtaining unit includes
- at least one light emitting unit that irradiates the medium placed on the placing surface with light, and
- a light receiving unit that detects the light reflected by the medium, the light being emitted by the light emitting unit, the gloss determining unit determines whether or not the medium is glossy on a basis of the information on the medium obtained by the light receiving unit, and wherein the light receiving unit is an image sensor, and whether or not the medium is glossy is determined on a basis of a difference image between images taken by the image sensor when the light emitting unit outputs two different light intensities.

3. The overhead image reading apparatus according to claim 1, wherein the light emitting unit is an infrared LED, and further comprising a wavelength cutoff filter, provided within a light path between the infrared LED and the light receiving unit, capable of blocking part or all of light in a visible wavelength range.

4. The overhead image reading apparatus according to claim 2, wherein the light emitting unit is an infrared LED, and further comprising a wavelength cutoff filter, provided within a light path between the infrared LED and the light receiving unit, capable of blocking part or all of light in a visible wavelength range.

* * * * *